(12) United States Patent
Sakurada et al.

(10) Patent No.: US 12,440,163 B2
(45) Date of Patent: Oct. 14, 2025

(54) SYSTEM AND METHOD FOR VITAL-DATA MEASUREMENT

(71) Applicant: Murata Manufacturing Co., Ltd., Nagaokakyo (JP)

(72) Inventors: Yuki Sakurada, Nagaokakyo (JP); Hironori Noto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 372 days.

(21) Appl. No.: 18/162,787

(22) Filed: Feb. 1, 2023

(65) Prior Publication Data

US 2023/0181113 A1    Jun. 15, 2023

Related U.S. Application Data

(63) Continuation of application No. PCT/JP2021/016097, filed on Apr. 20, 2021.

(30) Foreign Application Priority Data

Aug. 20, 2020   (JP) ................. 2020-139078

(51) Int. Cl.
*A61B 5/00* (2006.01)
*A61B 5/022* (2006.01)
(Continued)

(52) U.S. Cl.
CPC ............ *A61B 5/684* (2013.01); *A61B 5/0077* (2013.01); *A61B 5/022* (2013.01); *G06V 40/15* (2022.01);
(Continued)

(58) Field of Classification Search
None
See application file for complete search history.

(56) References Cited

U.S. PATENT DOCUMENTS

2006/0208882 A1    9/2006  Senga
2011/0305376 A1   12/2011  Neff
(Continued)

FOREIGN PATENT DOCUMENTS

CN    110522409 A    12/2019
GB    1916671.9    * 12/2019
(Continued)

OTHER PUBLICATIONS

International Search Report in PCT/JP2021/016097, mailed Jul. 20, 2021, 5 pages.

*Primary Examiner* — Patricia J Park
(74) *Attorney, Agent, or Firm* — ArentFox Schiff LLP

(57) ABSTRACT

A vital-data measurement controller is provided for controlling vital-data measurement when a user measures vital data by using a device data measurement. The measurement controller includes a controller that acquires image data including the user's face and the device by controlling a camera; and an image processor that authenticates the user's face and the based on the image data. The image processor then determines whether the device is worn by the user based on a positional relationship between the user and the device in the image data, and determines that a period in which the device is determined to be worn by the user after the authentication of the user and the device is a period of a proper state for measurement.

18 Claims, 12 Drawing Sheets

(51) Int. Cl.
*G06V 40/10* (2022.01)
*G06V 40/16* (2022.01)
*G06V 40/20* (2022.01)
*G06V 40/60* (2022.01)

(52) U.S. Cl.
CPC ............ *G06V 40/172* (2022.01); *G06V 40/23* (2022.01); *G06V 40/67* (2022.01)

(56) References Cited

U.S. PATENT DOCUMENTS

| | | | |
|---|---|---|---|
| 2018/0035901 A1* | 2/2018 | Cronin | A61B 5/00 |
| 2018/0085071 A1* | 3/2018 | Otsuka | A61B 5/6896 |
| 2019/0076064 A1 | 3/2019 | Tahara et al. | |
| 2019/0343407 A1* | 11/2019 | Huijbregts | A61B 5/70 |
| 2020/0252218 A1* | 8/2020 | Wexler | G06F 1/1686 |
| 2022/0110592 A1* | 4/2022 | Shigyo | A61B 5/1118 |
| 2022/0147608 A1 | 5/2022 | Mochizuki et al. | |
| 2022/0391487 A1* | 12/2022 | Mahmood | H04L 63/0861 |

FOREIGN PATENT DOCUMENTS

| | | |
|---|---|---|
| JP | 2006259922 A | 9/2006 |
| JP | 2006309562 A | 11/2006 |
| JP | 2009247733 A | 10/2009 |
| JP | 4430128 B1 | 3/2010 |
| JP | 2017219934 A | 12/2017 |
| JP | 2018023768 A | 2/2018 |
| JP | 2018109802 A | 7/2018 |
| JP | 2019121206 A | 7/2019 |
| JP | 2021026430 A | 2/2021 |

* cited by examiner

IMAGE DATA

EXAMPLE OF NOTIFICATION

EXAMPLE OF
NOTIFICATION

IMAGE DATA

SYSTEM AND METHOD FOR VITAL-DATA MEASUREMENT

CROSS REFERENCE TO RELATED APPLICATIONS

This application is a continuation of PCT Application No. PCT/JP2021/016097, filed Apr. 20, 2021, which claims priority to Japanese Patent Application No. 2020-139078, filed Aug. 20, 2020, the entire contents of each of which are hereby incorporated by reference in their entirety.

TECHNICAL FIELD

The present invention relates to a vital-data measurement controller, a vital-data measurement system, a method for determining a state for vital-data measurement, a program for determining a state for vital-data measurement, and a non-transitory computer readable storage medium.

BACKGROUND

It is known that a medical doctor uses vital data (e.g., vital signs/biometric information) measured by a patient (e.g., user) at home as auxiliary information to diagnose the patient, for example, when performing remote diagnosis and treatment. Such vital data includes body temperature, pulse rate, blood pressure, and pulmonary sound. However, it is also necessary to prove that the measured vital data is the user's own data in such technology.

Japanese Patent Application Publication No. 2018-23768 (hereinafter "Patent Document 1") discloses a method for determining a state for blood pressure measurement. In this method of Patent Document 1, a user holds a smartphone or a tablet computer and takes a picture of the user's own face by using a camera in the smartphone or the tablet computer, and it is determined whether the user is in a correct posture for measurement (state for measurement) by using the estimation of the height of the sphygmomanometer worn on the user's arm with respect to the height of the user's heart based on the captured image data. In this way, it is expected that the likelihood of the user intentionally making improper measurement can be reduced.

Moreover, the personal authentication of the user is performed by using face recognition based on the image data including the user's face captured by using the camera in the smartphone or the tablet computer to provide the proof described above in this method for determining a state for blood pressure measurement. In this way, it is expected that the likelihood of a person other than the user measuring blood pressure can be reduced.

However, improper replacement of blood pressure data in which a third party's blood pressure data is provided instead of the user's blood pressure data is possible in the above method for determining a state for blood pressure measurement because the third party can wear the sphygmomanometer (i.e., the measurement device) and measure blood pressure while the user performs personal authentication by using face recognition based on the image data captured by the camera.

In this regard, Patent Document 1 describes a method for measuring the user's pulse count by analyzing coloration information of the body surface in time sequence by using the image data that includes the user's face captured by a camera. A comparison of the pulse count obtained from the image data and the pulse count obtained from the sphygmomanometer in this method enables the confirmation that the blood pressure measured by using the sphygmomanometer represents the user's blood pressure. However, this method is not applicable to measurements of vital data other than blood pressure.

SUMMARY OF THE INVENTION

Thus, the present invention provides a vital-data measurement controller, a vital-data measurement system, a method for determining a state for vital-data measurement, a program for determining a state for vital-data measurement, and a non-transitory computer readable storage medium that reduces the likelihood of improper replacement of various kinds of vital data.

In an exemplary aspect, a data measurement controller is configured to control vital-data measurement when a user measures vital data by using at least one device for vital-data measurement. Moreover, the vital-data measurement controller includes: a controller configured to acquire image data including the user's face and the at least one device by controlling an image capturing apparatus; and an image processor configured to authenticate the user's face and the at least one device based on the image data. The image processor is configured to determine whether the at least one device is worn by the user based on a positional relationship between the user and the at least one device in the image data, and determine that a period in which the at least one device is determined to be worn by the user after the authentication of the user and the at least one device is a period of a proper state for measurement.

In another exemplary aspect, a data measurement controller is provided to control vital-data measurement when a user measures vital data by using at least one device for vital-data measurement. In this aspect, the vital-data measurement controller includes a controller configured to acquire user-image data and device-image data by controlling an image capturing apparatus, the user-image data including the user's face and a body portion of the user other than the face, the device-image data including the body portion of the user other than the face and the at least one device; and an image processor configured to authenticate the user's face based on the user-image data and authenticate the at least one device based on the device-image data. The image processor is configured to determine whether the at least one device is worn by the user, the determination being based on a relationship between the body portion of the user other than the face in the user-image data and the body portion of the user other than the face in the device-image data and a positional relationship between the body portion of the user other than the face and the at least one device in the device-image data, and determine that a period in which the at least one device is determined to be worn by the user after the authentication of the user and the at least one device is a period of a proper state for measurement.

In another exemplary aspect, a data measurement system is provided that includes the vital-data measurement controller described above, with the vital-data measurement controller being configured to control vital-data measurement when a user measures vital data by using at least one device for vital-data measurement; the at least one device; the image capturing apparatus; and a host apparatus configured to receive the vital data from the vital-data measurement controller.

In another exemplary aspect, a method is provide for determining a state for vital-data measurement when a user measures vital data by using at least one device for vital-data measurement. In this aspect, the method includes acquiring image data including the user's face and the at least one device by controlling an image capturing apparatus; authenticating the user's face and the at least one device based on the image data; determining whether the at least one device is worn by the user based on a positional relationship between the user and the at least one device in the image data; and determining that a period in which the at least one device is determined to be worn by the user after the authentication of the user and the at least one device is a period of a proper state for measurement.

In another exemplary aspect, a method is provided for determining a state for vital-data measurement when a user measures vital data by using at least one device for vital-data measurement. In this aspect, the method includes acquiring user-image data and device-image data by controlling an image capturing apparatus, the user-image data including the user's face and a body portion of the user other than the face, the device-image data including the body portion of the user other than the face and the at least one device; authenticating the user's face based on the user-image data and authenticating the at least one device based on the device-image data; determining whether the at least one device is worn by the user, the determination being based on a relationship between the body portion of the user other than the face in the user-image data and the body portion of the user other than the face in the device-image data and a positional relationship between the body portion of the user other than the face and the at least one device in the device-image data; and determining that a period in which the at least one device is determined to be worn by the user after the authentication of the user and the at least one device is a period of a proper state for measurement.

In another exemplary aspect, a program is provided for determining a state for vital-data measurement when a user measures vital data by using at least one device for vital-data measurement. In this aspect, the program causes a computer to execute a process including acquiring image data including the user's face and the at least one device by controlling an image capturing apparatus; authenticating the user's face and the at least one device based on the image data; determining whether the at least one device is worn by the user based on a positional relationship between the user and the at least one device in the image data; and determining that a period in which the at least one device is determined to be worn by the user after the authentication of the user and the at least one device is a period of a proper state for measurement.

In another exemplary aspect, a program is provided for determining a state for vital-data measurement when a user measures vital data by using at least one device for vital-data measurement. In this aspect, the program causes a computer to execute a process including acquiring user-image data and device-image data by controlling an image capturing apparatus, the user-image data including the user's face and a body portion of the user other than the face, the device-image data including the body portion of the user other than the face and the at least one device; authenticating the user's face based on the user-image data and authenticating the at least one device based on the device-image data; determining whether the at least one device is worn by the user, the determination being based on a relationship between the body portion of the user other than the face in the user-image data and the body portion of the user other than the face in the device-image data and a positional relationship between the body portion of the user other than the face and the at least one device in the device-image data; and determining that a period in which the at least one device is determined to be worn by the user after the authentication of the user and the at least one device is a period of a proper state for measurement.

Yet further, a storage medium in an exemplary aspect is a non-transitory computer readable storage medium storing the program for determining a state for vital-data measurement described above.

According to the exemplary aspects of the present invention, the likelihood of improper replacement of various kinds of vital data is reduced.

DESCRIPTION OF EXEMPLARY EMBODIMENTS

Figure 1:
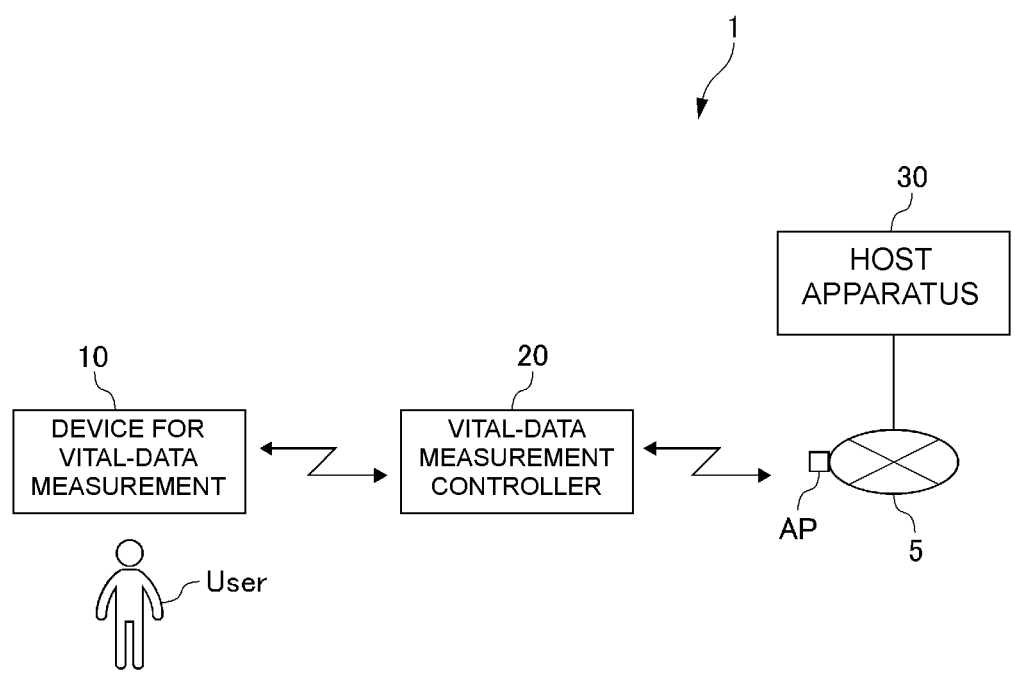
FIG. 1 illustrates a vital-data measurement system according to exemplary embodiments.

Hereinafter, embodiments of the present invention will be described as an example with reference to the attached drawings. It is noted that the same or corresponding portions in the drawings are denoted by the same symbols.

First Exemplary Embodiment

<Vital-Data Measurement System>

FIG. 1 illustrates a vital-data measurement system according to the present embodiment. As shown, a vital-data measurement system 1 illustrated in FIG. 1 includes a device for vital-data measurement 10 (also simply referred to as a "device" hereinafter), a vital-data measurement controller 20 (also simply referred to as a "measurement controller" hereinafter), and a host apparatus 30. The vital-data measurement system 1 is used to perform, for example, remote diagnosis and treatment of a user. In such a case, the user possesses/operates the device 10 and the measurement controller 20, and a medical doctor possesses/operates the host apparatus 30.

The device for vital-data measurement 10 is what is called a biometric-information sensor device, and examples of the device for vital-data measurement 10 include a sphygmomanometer, a pulse monitor, an electrocardiograph, a stethoscope, a throat inspection instrument, and an ear inspection instrument. The device 10 is controlled by the measurement controller 20 to measure vital data (e.g., critical or important biological data) of the user. The device 10 is configured to transmit the measured vital data to the measurement controller 20.

The vital-data measurement controller 20 is an information processing apparatus, and examples of the vital-data measurement controller 20 include a smartphone, a tablet computer, and a PC. The measurement controller 20 is configured to control measurement of vital data by the device 10 and receive the vital data from the device 10 when the user measures the vital data. The measurement controller 20 is also configured to transmit the vital data to the host apparatus 30 and receive information (for example, the registration information of the device 10) from the host apparatus 30 via a network 5. Details of the measurement controller 20 will be described below.

The host apparatus 30 is an information processing apparatus, and examples of the host apparatus 30 include a tablet computer and a PC. The host apparatus 30 is configured to receive vital data from the measurement controller 20 and transmit information (for example, the registration information of the device 10) to the measurement controller 20 via the network 5.

Any communication standard may be adopted for the communication between the device 10 and the measurement controller 20, and what is called a short-range wireless communication standard may be adopted. Examples of such a short-range wireless communication standard include Bluetooth® and Wi-Fi®. Any communication standard may also be adopted for the communication between the measurement controller 20 and the host apparatus 30, and the communication may be established, for example, via an access point AP and the network 5 based on a wireless communication standard or a communication standard such as a wired LAN. Examples of such a wireless communication standard include a wireless Local Area Network (LAN), Long Term Evolution (LTE), and 3G mobile communication system.

<<Vital-Data Measurement Controller>>

Figure 2:
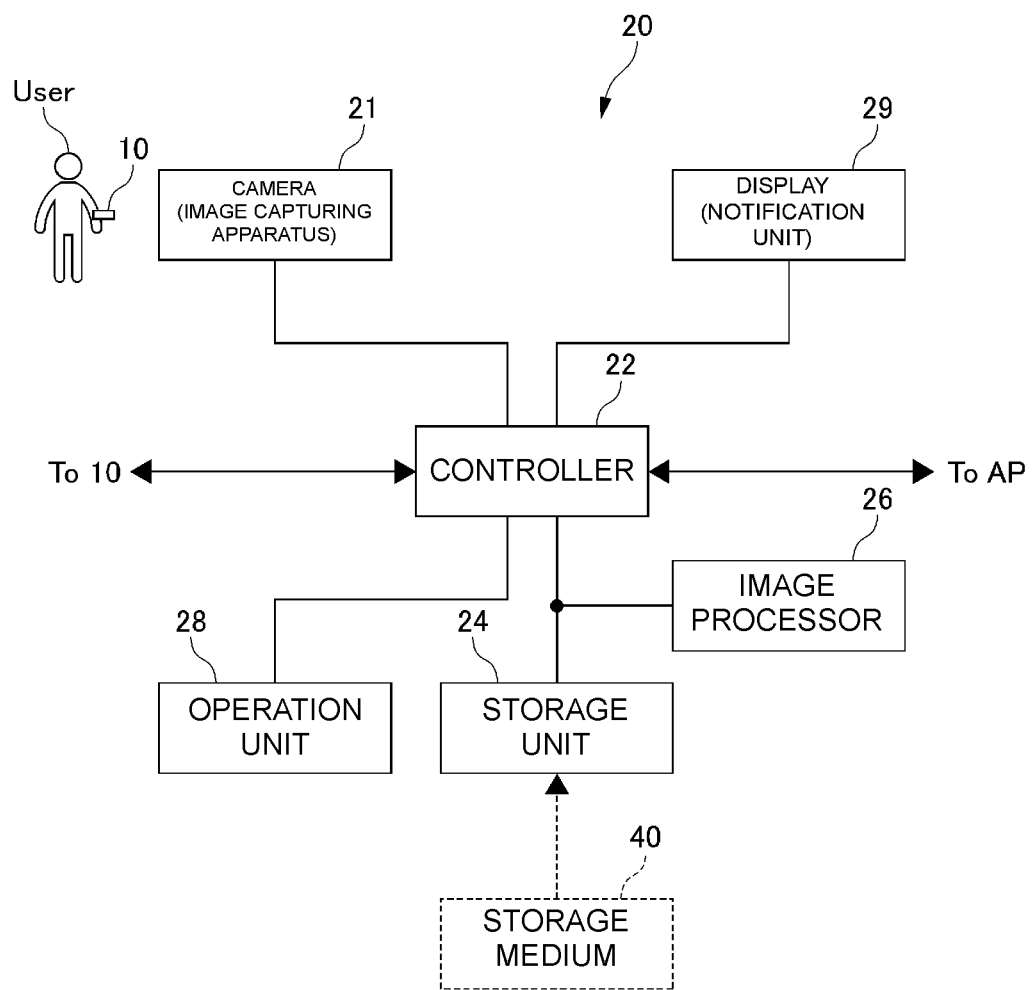
FIG. 2 illustrates a vital-data measurement controller according to exemplary embodiments.

Details of the vital-data measurement controller 20 will be described herein. FIG. 2 illustrates the vital-data measurement controller according to the present embodiment. As shown, the vital-data measurement controller 20 illustrated in FIG. 2 includes a camera (e.g., an image capturing apparatus) 21, a controller 22, a storage unit 24, an image processor 26, an operation unit 28, and a display (e.g., a notification unit) 29.

The camera 21 is controlled by the controller 22 to capture the images of the user and the device 10 and is configured to generate image data including the user's face and the device 10. The camera 21 is configured to transmit the image data to the controller 22.

Examples of the camera 21 include a camera built into the measurement controller 20, such as a smartphone, a tablet computer, or a PC, and a camera externally added to the measurement controller 20. Since a camera built into an apparatus such as a smartphone, a tablet computer, or a PC possesses limited capabilities with respect to the functionality such as panning, tilting, zooming, or wide-angle view mode, using an externally added camera in an exemplary aspect can improve such capabilities. Moreover, an externally added camera can minimize the movement of the camera or the user for capturing the image of a target.

The controller 22 is configured to acquire image data including the user's face and the device 10 by controlling the camera 21. The controller 22 is configured to transmit the image data to the image processor 26. The controller 22 can be configured to temporarily save the image data to the storage unit 24 or control the display 29 to display the image data.

The controller 22 is also configured to control the device 10 and acquire the vital data of the user measured by using the device 10. The controller 22 is configured to temporarily save the acquired vital data to the storage unit 24. The controller 22 is configured to transmit the vital data saved to the storage unit 24 to the host apparatus 30.

The storage unit 24 is configured to temporarily store the vital data. The storage unit 24 is also configured to store in advance the feature value of the user's face for the authentication of the user, which is described below, as the registration information of the user. The storage unit 24 is also configured to store in advance the feature values of the devices for the authentication of the devices, which is described below, as the registration information of the devices.

The image processor 26 is configured to authenticate the user's face based on the image data. For example, the image processor 26 is configured to compare the user's face in the image data with the registration information of the user stored in advance in the storage unit 24. The image processor 26 is also configured to authenticate the device 10 based on the image data. That is, the image processor 26 is similarly configured to compare the device 10 in the image data with the feature values of the devices stored in the storage unit 24.

The image processor 26 is also configured to determine whether the device 10 is worn by the user based on the image data. For example, the image processor 26 is configured to determine whether the device 10 is worn by the user based on the positional relationship between the user and the device 10 in the image data.

The image processor 26 is configured to determine that the period in which the device 10 is determined to be worn by the user after the authentication of the user and the device 10 is the period of the proper state for measurement in which the proper user wears the proper device 10.

The storage unit 24, which is described above, is configured to store programs (e.g., software applications) and/or data to be executed by the controller 22 and the image processor 26. According to exemplary aspects, the storage unit 24 can be one or more of a storage medium such as a read only memory (ROM), a hard disk drive (HDD), a solid state drive (SSD), or a detachable memory card.

According to exemplary aspects, the controller 22 and the image processor 26, which are described above, can be one or more of a computing processor such as a central processing unit (CPU), a digital signal processor (DSP), or a field-programmable gate array (FPGA). The functions of the controller 22 and the image processor 26 are performed, for example, by the execution of the programs (e.g., software applications) stored in the storage unit 24. The programs (e.g., software applications) may be provided via a network or in the form of a computer readable storage medium 40, such as a compact disc read only memory (CD-ROM) or a digital versatile disc (DVD), in which the programs (applications) are stored. Examples of the storage medium include a non-transitory tangible medium.

The user performs operation by using the operation unit 28. According to exemplary aspects, the operation unit 28 can be, for example, a component such as a keyboard or a mouse having a hardware button for operation or a component such as a touch panel having a software button for operation.

The display 29 is a notification unit configured to notify the user of information. According to exemplary aspects, the display 29 can be, for example, a liquid crystal display or an organic EL display. The notification unit is not limited to the above components, and examples of the notification unit include a loudspeaker configured to give a notification with sound such as buzzer sound and a light-emitting element such as an LED configured to give a notification with light such as light emission, blinking, or colored light.

Figure 3:
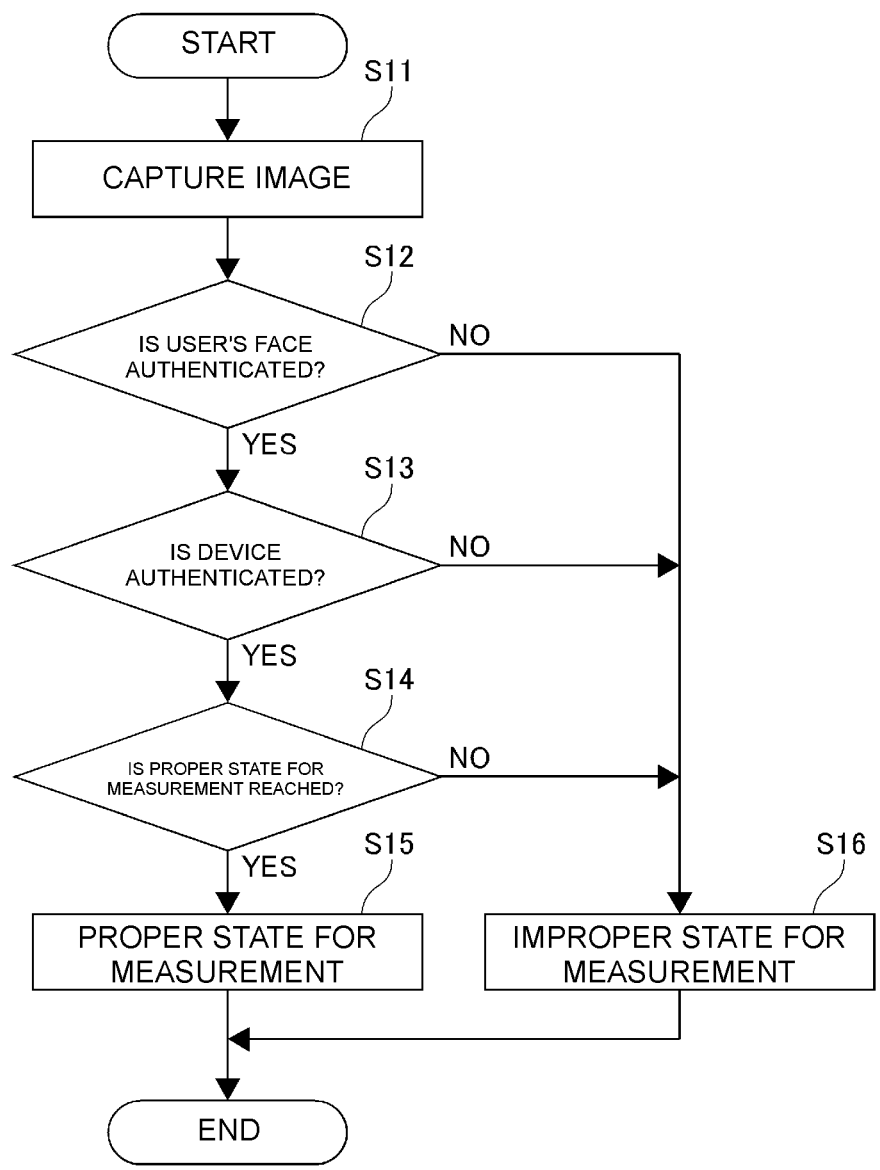
FIG. 3 is a flowchart of the operation of determining a state for vital-data measurement according to a first exemplary embodiment.
Figure 5:
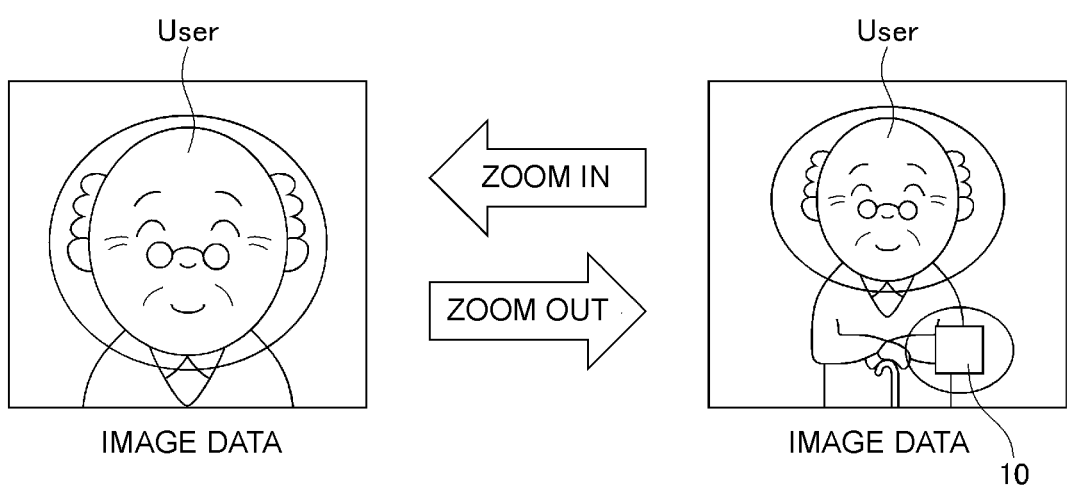
FIG. 5 illustrates an example of image data.
Figure 6:
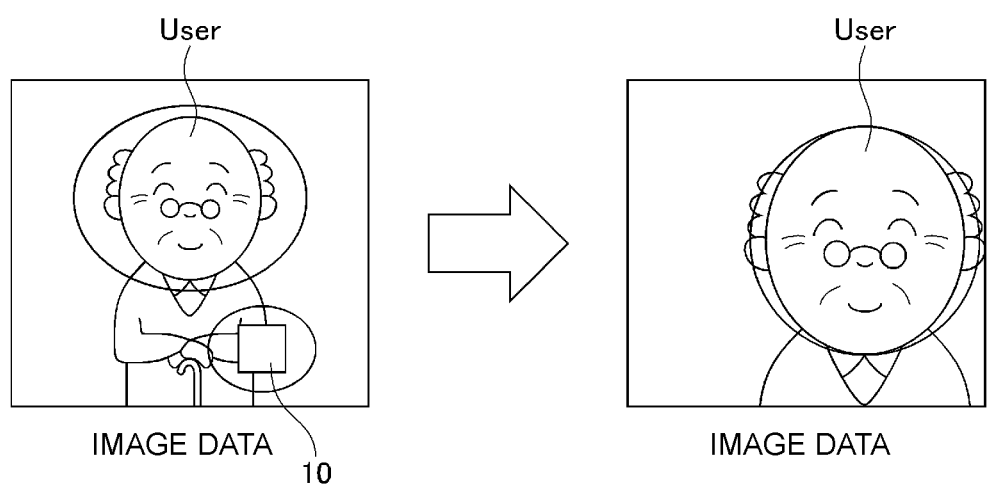
FIG. 6 illustrates an example of image data.

Next, referring to FIGS. 3 to 6, a description will be given with regard to the operation of determining a state for vital-data measurement by using the vital-data measurement controller 20, which is described above. FIG. 3 is a flowchart of the operation of determining a state for vital-data measurement by using the vital-data measurement controller 20 according to the first embodiment, and FIGS. 4 to 6 illustrate an example of the image data.

The user starts to measure vital data by operating the operation unit 28 of the vital-data measurement controller 20. Then, as illustrated in FIG. 3, the vital-data measurement controller 20 performs the authentication of the user, the authentication of the device, and the determination of a state for measurement.

First, the controller 22 captures the images of the user's face and the device 10 by controlling the camera 21 and acquires image data including the user's face and the device 10 (step S11). The controller 22 transmits the acquired image data to the image processor 26. The controller 22 may temporarily save the image data to the storage unit 24, and the image processor 26 may acquire the image data stored in the storage unit 24. The controller 22 can also be configured to control the display 29 to display the image data.

Figure 4:
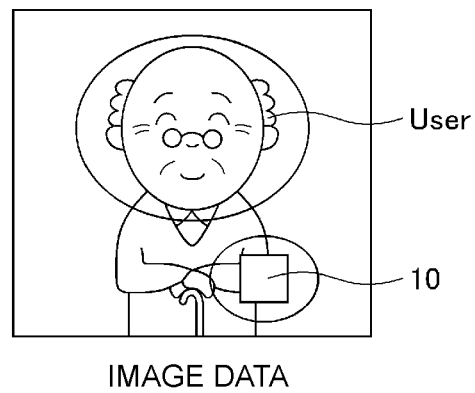
FIG. 4 illustrates an example of image data.

Next, as illustrated in FIG. 4, the image processor 26 authenticates the user's face based on the image data (step S12).

In an exemplary aspect, the storage unit 24 stores in advance the feature value of the user's face as the registration information of the user. The feature value of the user's face may be the image data of the user's image captured in advance by using a camera or alternatively the image data obtained, in advance by using a camera, by taking a picture of the photograph such as in the driver's license or in the passport issued by a public organization. The image processor 26 verifies whether the user's face in the image data matches the registered user's face by comparing the user's face in the image data with the registration information of the user stored in advance in the storage unit 24.

The controller 22 can be configured to control panning and tilting of the camera 21 so that the user's face and the device 10 are located at appropriate positions in the image data at this time. This procedure can minimize the movement of the camera or the user for capturing the image of the target.

In addition, as illustrated in FIG. 5, the controller 22 can be configured to control zooming and wide-angle view mode of the camera 21 so that the user's face and the device 10 are located at appropriate positions in the image data. This procedure can minimize the movement of the camera or the user for capturing the image of the target.

In an exemplary aspect, the controller 22 can be configured to control the camera 21 to zoom in on the user's face so as to obtain an enlarged image of the user's face. The authentication of the user's face described above may be performed at this time. This procedure improves the accuracy of the authentication of the user's face. In addition, the controller 22 can be configured to control the camera 21 to zoom out or switch to the wide-angle view mode so that the user's face and the device 10 are included. The authentication of the device 10 described below may be performed at this time.

Once the user's face is authenticated, the image processor 26 authenticates the device 10 based on the image data (step S13).

For example, the storage unit 24 stores in advance the feature values of multiple devices as the registration information of the devices. Examples of the feature values of the devices include the shape of each type of the devices and the identification information of each device such as the serial number or the QR Code®. The feature values of the devices may be acquired, for example, from the host apparatus 30. The image processor 26 verifies whether the device 10 in the image data has been registered by comparing the shape or the identification information (such as the serial number or the QR code) of the device 10 in the image data with device registration information (the shapes or the identification information such as the serial numbers or the QR codes of the devices) stored in advance in the storage unit 24.

Alternatively, the storage unit 24 stores in advance the feature values of multiple devices and the associated identification information as the registration information of the devices. Examples of the feature value of a device include the shape of each type of the device and the QR code of each device, and examples of the identification information of the device include the serial number of each device. First, when starting measurement, the user enters the identification information such as the serial number of the device to be used. This procedure enables the image processor 26 to identify the type of the device from the multiple types of the devices by comparing the entered identification information with the device registration information (identification information) stored in advance in the storage unit 24. The position at which the device is to be disposed can also be determined based on the type of the device. Consequently, the accuracy of the authentication of the device can be improved after this procedure.

Subsequently, the image processor 26 can be configured to verify whether the device 10 in the image data has been registered by comparing the shape or the QR code of the device in the image data with the device registration information that is stored in advance in the storage unit 24 and that corresponds to the identified type of the device.

Once the device 10 is authenticated, the image processor 26 determines whether the device 10 is worn by the user based on the positional relationship between the user and the device 10 in the image data (S14).

Once it is determined that the device 10 is worn by the user, the image processor 26 determines that the proper state for measurement in which the proper user wears the proper device is reached (S15).

In contrast, the image processor 26 determines that the proper state for measurement in which the proper user wears the proper device is not reached (S16) if the user's face cannot be authenticated in step S12, if the device 10 cannot be authenticated in step S13, or if the device 10 is not worn by the user in step S14.

The measurement controller 20 continues to repeat the operation in steps S11 to S16, which is described above, and determines that a period in which the device 10 is determined to be worn by the user after the authentication of the user and the device 10 is the period of the proper state for measurement in which the proper user wears the proper device.

Moreover, in an exemplary aspect, the controller 22 of the measurement controller 20 can be configured to measure the vital data of the user by using the device 10 during the determination of the period of the proper state for measurement, which is described above. In such a case, for example, the vital data measured by using the device 10 includes the information with regard to the measurement period, and the information with regard to the determination of the period of the proper state for measurement includes the information with regard to the determination period. Then, based on the period of the proper state for measurement (determination period), which is described above, and the measurement period of the vital data, it can be determined that the vital data measured during the period of the proper state for measurement (determination period) is highly reliable data.

Alternatively, in accordance with the determination of the period of the proper state for measurement, which is described above, the controller 22 of the measurement controller 20 can be configured to control the device 10 to measure the vital data of the user during a period determined to be the period of the proper state for measurement and control the device 10 not to measure the vital data of the user during a period other than the period determined to be the period of the proper state for measurement. For example, as illustrated in FIG. 6, when the device 10 is outside the area covered by the image data (NO in step S13), the measurement of the vital data is finished.

As described above, the following procedures are performed by the vital-data measurement controller 20 or in the method for determining a state for vital-data measurement according to the present embodiment.

- Authenticating the user's face and the device 10 based on the image data.
- Determining whether the device 10 is worn by the user based on the positional relationship between the user and the device 10 in the image data.
- Determining that the period in which the device. 10 is determined to be worn by the user after the authentication of the user and the device 10 is the period of the proper state for measurement in which the proper user wears the proper device 10.

In this way, it is possible to verify that the vital data is measured during the period of the proper state for measurement in which the proper user wears the proper device 10. In other words, the system and method can also determine improperly replaced vital data measured during a period other than the period of the proper state for measurement in which the proper user wears the proper device 10. Consequently, the likelihood of improper replacement of various kinds of vital data is reduced.

First Modification of the Exemplary Aspect

When repeating the operation in steps S11 to S16, which is described above, the controller 22 may control panning, tilting, zooming, or wide-angle view mode of the camera 21 in such a manner that the camera 21 follows the movement of the user. According to this procedure, the user's face and the device 10 are unlikely to be outside the area covered by the image data, and the likelihood of improper replacement of the vital data can more effectively be reduced.

Second Modification of the Exemplary Aspect

Figure 7:
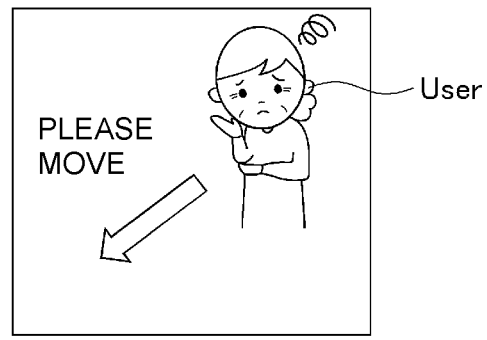
FIG. 7 illustrates an example of a notification to urge a user to move.

The controller 22 can also be configured to control the display (notification unit) 29 to give a notification to urge the user to move to an appropriate position (for example, the arrow and the message in FIG. 7). According to this procedure, the user's face and the device 10 are unlikely to be outside the area covered by the image data, and the likelihood of improper replacement of the vital data can more effectively be reduced.

Third Modification of the Exemplary Aspect

Figure 8:
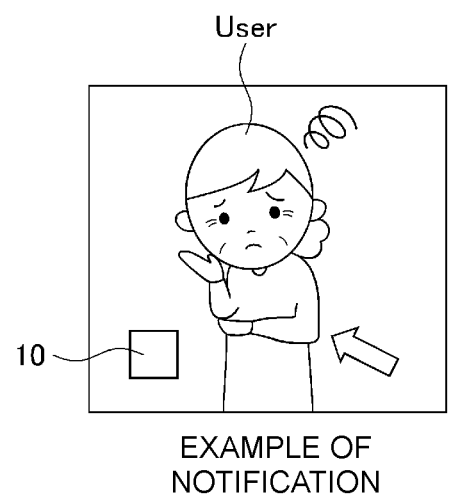
FIG. 8 illustrates an example of a notification of a position at which a device is to be disposed.

The controller 22 may also be configured to control the display (notification unit) 29 to notify the user of the appropriate position at which the device is to be disposed (for example, the arrow in FIG. 8). This procedure enables the user to wear the device 10 at the appropriate position, and a more appropriate state for measurement is reached.

Fourth Modification of the Exemplary Aspect

In addition, when determining in step S14 whether the proper state for measurement is reached, which is described above, the image processor 26 can be configured to determine whether the position at which the device 10 is disposed is appropriate. This procedure improves the accuracy of the measurement data.

Fifth Modification of the Exemplary Aspect

Figure 9:
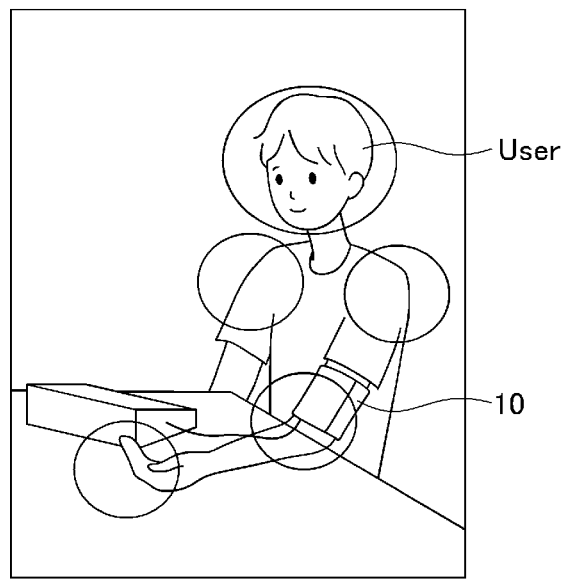
FIG. 9 illustrates an example of image data presenting an appropriate posture.

In addition, when determining in step S14 whether the proper state for measurement is reached, which is described above, the image processor 26 can be configured to determine whether the user's posture is appropriate. For example, the image processor 26 determines whether the proper state for measurement is reached based on the type of the device 10, the positional relationship between the user's face and the body portions other than the face (for example, the positional relationship between the face, the shoulders, the elbow, and the hand in FIG. 9), and the movement of the user's entire body per unit time in the image data, the proper state for measurement being a quiet posture in accordance with the type of the device 10. This procedure can improve the accuracy of the measurement data.

Second Exemplary Embodiment

In the first embodiment, which is described above, the description has been given with regard to the case where the user's face and the device 10 are included in a single piece of image data. However, in the field of remote diagnosis and treatment, it is sometimes difficult to include the user's face and the device 10 in a single piece of image data because of the factors such as the position at which the device 10 is disposed, the limitation on the distance between the user and the measurement controller 20, and the limitation on the functionality of the camera 21 (for example, panning, tilting, zooming, and wide-angle view mode). In the second embodiment, a description will be given with regard to the case where the user's face and the device 10 are included in separate pieces of image data.

It is noted that the configurations of the vital-data measurement system 1 and the vital-data measurement controller 20 according to the second embodiment are the same as the configurations of the vital-data measurement system 1 and the vital-data measurement controller 20 according to the first embodiment, which are illustrated in FIGS. 1 and 2. In the second embodiment, the functionality and the operation of the controller 22 and the image processor 26 of the vital-data measurement controller 20 differ from the functionality and the operation described in the first embodiment.

<<Case of Two Pieces of Image Data>>

The controller 22 is configured to acquire user-image data and device-image data by controlling the camera 21. The user-image data includes the user's face and a body portion of the user other than the face, and the device-image data includes the body portion of the user other than the face and the device 10. The controller 22 is configured to transmit the user-image data and the device-image data to the image processor 26. The controller 22 can also be configured to control the display 29 to sequentially display the user-image data and the device-image data.

The image processor 26 is configured to authenticate the user's face based on the user-image data. For example, the image processor 26 is configured to compare the user's face in the user-image data with the registration information of the user stored in advance in the storage unit 24. The image processor 26 is also configured to authenticate the device 10 based on the device-image data. For example, the image processor 26 is configured to compare the device 10 in the device-image data with the feature values of the devices stored in the storage unit 24.

The image processor 26 is also configured to determine whether the device 10 is worn by the user, and the determination is based on the relationship between the body portion of the user other than the face in the user-image data and the body portion of the user other than the face in the device-image data, and the positional relationship between the body portion of the user other than the face and the device 10 in the device-image data.

The image processor 26 is configured to determine that the period in which the device 10 is determined to be worn by the user after the authentication of the user and the device 10 is the period of the proper state for measurement in which the proper user wears the proper device 10.

<<Case of Three or More Pieces of Image Data>>

The controller 22 is configured to acquire the first user-image data, the n-th user-image data, and device-image data by controlling the camera 21. The first user-image data includes the user's face and the first body portion of the user other than the face, the n-th user-image data includes the (n−1)-th body portion of the user and the n-th body portion of the user, and the device-image data includes the n-th body portion of the user and the device, the (n−1)-th body portion of the user being other than the face, the n-th body portion of the user being other than the (n−1)-th body portion (where n is an integer equal to 2 or larger and equals the number of pieces of user-image data, which equals (the number of pieces of image data−1)). The controller 22 is configured to transmit the first user-image data, the n-th user-image data, and the device-image data to the image processor 26. The controller 22 can also be configured to control the display 29 to sequentially display the first user-image data, the n-th user-image data, and the device-image data.

The image processor 26 is configured to authenticate the user's face based on the first user-image data. For example, the image processor 26 is configured to compare the user's face in the first user-image data with the registration information of the user stored in advance in the storage unit 24. The image processor 26 is also configured to authenticate the device 10 based on the device-image data. For example, the image processor 26 is configured to compare the device 10 in the device-image data with the feature values of the devices stored in the storage unit 24.

The image processor 26 is also configured to determine whether the device 10 is worn by the user, and the determination is based on the relationship between the first body portion of the user other than the face in the first user-image data and the (n−1)-th body portion of the user in the n-th user-image data, the relationship between the n-th body portion of the user in the n-th user-image data and the n-th body portion of the user in the device-image data, and the positional relationship between the n-th body portion of the user other than the face and the device 10 in the device-image data.

The image processor 26 is configured to determine that the period in which the device 10 is determined to be worn by the user after the authentication of the user and the device 10 is the period of the proper state for measurement in which the proper user wears the proper device 10.

Figure 10:
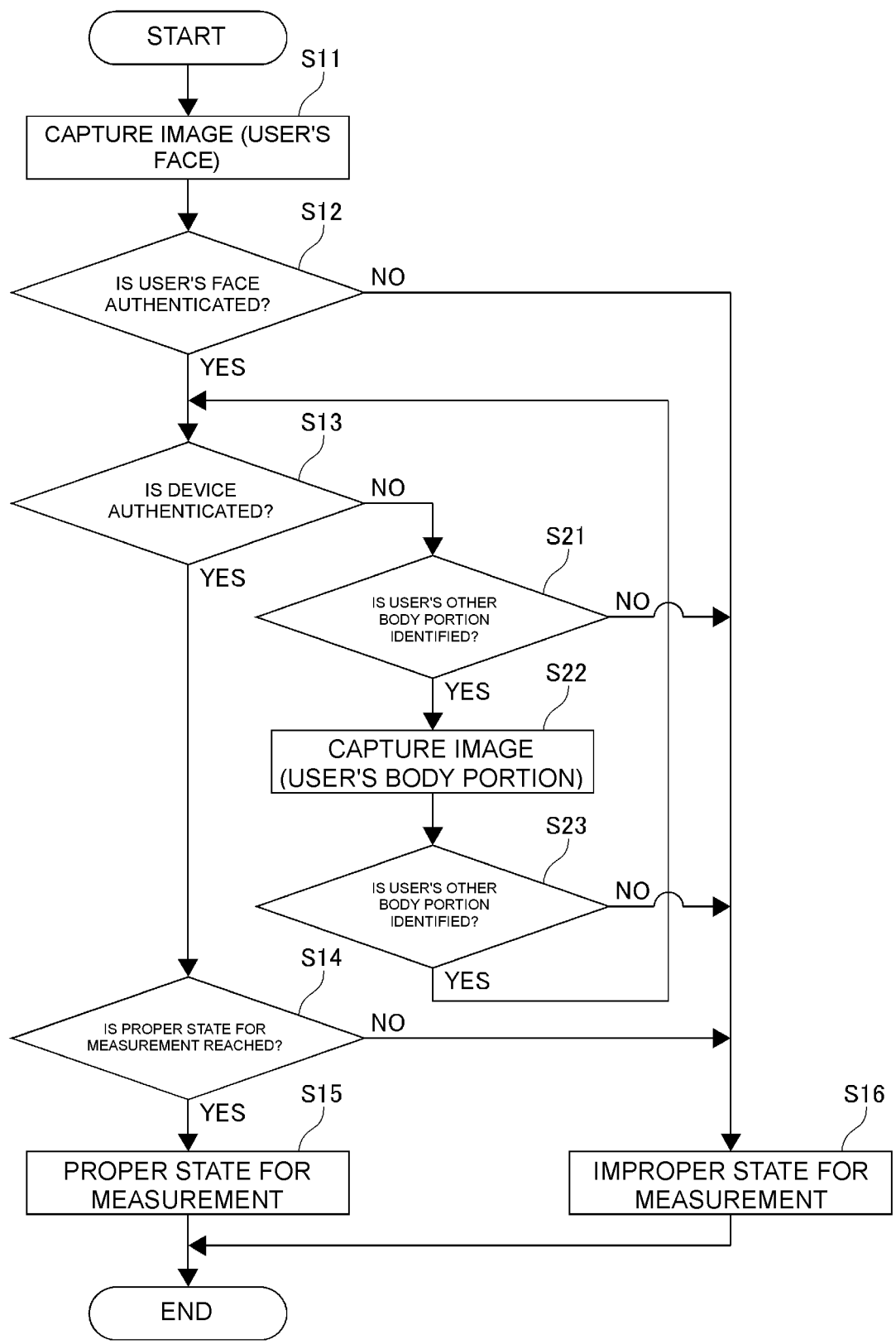
FIG. 10 is a flowchart of the operation of determining a state for vital-data measurement according to a second exemplary embodiment.
Figure 11:
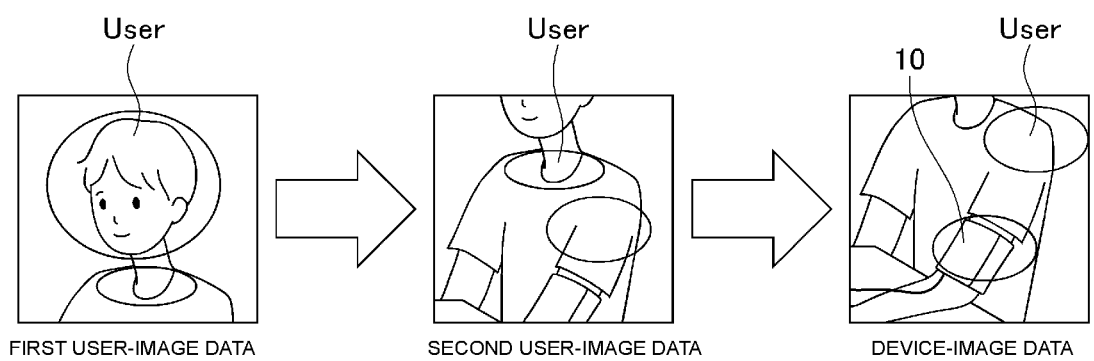
FIG. 11 illustrates an example of user-image data and device-image data.

Next, referring to FIGS. 10 and 11, a description will be given with regard to the operation of determining a state for vital-data measurement by using the vital-data measurement controller 20 according to the second exemplary embodiment. FIG. 10 is a flowchart of the operation of determining a state for vital-data measurement by using the vital-data measurement controller 20 according to the second embodiment, and FIG. 11 illustrates examples of the user-image data and the device-image data.

In operation, the user starts to measure vital data by operating the operation unit 28 of the vital-data measurement controller 20. Then, as illustrated in FIG. 10, the vital-data measurement controller 20 performs the authentication of the user, the authentication of the device, and the determination of a state for measurement.

First, the controller 22 captures the image of the user's face by controlling the camera 21 and acquires the first user-image data including the user's face in a manner similar to the above (step S11). The controller 22 transmits the acquired first user-image data to the image processor 26. The controller 22 can also be configured to control the display 29 to display the first user-image data.

Next, the image processor 26 authenticates the user's face based on the first user-image data in a manner similar to the above (step S12). For example, as illustrated in FIG. 11, the image processor 26 verifies whether the user's face in the first user-image data matches the registered user's face by comparing the user's face in the first user-image data with the registration information of the user stored in advance in the storage unit 24.

Once the user's face is authenticated, the image processor 26 authenticates the device 10 based on the first user-image data in a manner similar to the above (step S13). The process proceeds to step S14 after the authentication of the device 10 in a manner similar to the above.

In contrast, if the device 10 cannot be authenticated, it is possible that the first user-image data does not include the device 10. In such a case, the image processor 26 identifies the first body portion of the user other than the face (the neck in FIG. 11) based on the first user-image data (step S21).

Once the first body portion of the user (the neck in FIG. 11) is identified, the controller 22 captures the image of the first body portion of the user (the neck in FIG. 11) by controlling the movement of the camera 21 and acquires the second user-image data including the first body portion of the user (the neck in FIG. 11) (step S22). The controller 22 then transmits the acquired second user-image data to the image processor 26. The controller 22 can also be configured to control the display 29 to display the second user-image data.

Based on the relationship between the first body portion of the user (the neck in FIG. 11) in the first user-image data and the first body portion of the user (the neck in FIG. 11) in the second user-image data, the image processor 26 determines whether the first body portion (the neck in FIG.

11) in the second user-image data is a body portion of the user whose face has been authenticated (step S23).

If it is determined that the first body portion (the neck in FIG. 11) in the second user-image data is a body portion of the user whose face has been authenticated, the process returns to step S13, and the image processor 26 authenticates the device 10 based on the second user-image data in a manner similar to the above (step S13). The process proceeds to step S14 after the authentication of the device 10 in a manner similar to the above.

In contrast, if the device 10 cannot be authenticated, it is possible that the second user-image data does not include the device 10. In such a case, the operation in steps S21 to S23 and step S13 is repeated. Namely, the image processor 26 identifies the second body portion of the user (the shoulder in FIG. 11) other than the first body portion (the neck in FIG. 11) based on the second user-image data (step S21).

Once the second body portion of the user (the shoulder in FIG. 11) is identified, the controller 22 captures the images of the second body portion of the user (the shoulder in FIG. 11) and the device 10 by controlling the movement of the camera 21 and acquires the device-image data including the second body portion of the user (the shoulder in FIG. 11) and the device 10 (step S22). The controller 22 transmits the acquired device-image data to the image processor 26. The controller 22 can also be configured to control the display 29 to display the device-image data.

Based on the relationship between the second body portion of the user (the shoulder in FIG. 11) in the second user-image data and the second body portion of the user (the shoulder in FIG. 11) in the device-image data, the image processor 26 determines whether the second body portion (the shoulder in FIG. 11) in the device-image data is a body portion of the user whose face has been authenticated (step S23).

If it is determined that the second body portion (the shoulder in FIG. 11) in the device-image data is a body portion of the user whose face has been authenticated, the process returns to step S13, and the image processor 26 authenticates the device 10 based on the device-image data in a manner similar to the above (step S13).

For example, the image processor 26 verifies whether the device 10 in the device-image data has been registered by comparing the shape or the identification information (such as the serial number or the QR code) of the device in the device-image data with the device registration information (the shapes or the identification information such as the serial numbers or the QR codes of the devices) stored in advance in the storage unit 24.

Alternatively, the image processor 26 first identifies the type of the device from the multiple types of the devices by comparing the identification information entered by the user with the device registration information (identification information) stored in advance in the storage unit 24. The position at which the device is to be disposed can also be determined based on the type of the device. Consequently, the accuracy of the authentication of the device can be improved after this procedure. Subsequently, the image processor 26 verifies whether the device in the device-image data has been registered by comparing the shape or the QR code of the device in the device-image data with the device registration information that is stored in advance in the storage unit 24 and that corresponds to the identified type of the device. The process proceeds to step S14 after the authentication of the device in a manner similar to the above.

In contrast, if the device still cannot be authenticated, it is possible that the image data does not include the device either at this time. In such a case, the operation in steps S21 to S23 and step S13 is repeated. In this way, multiple images are captured while the image capture region moves from the user's face toward a hand or a toe, and the corresponding multiple pieces of image data inherit the authentication of the user's face based on the relationships between the body portions of the user, leading to the authentication of the device. Then, if a body portion of the user (for example, fingers and toes) fails to be identified in step S21, the process proceeds to step S16.

Once the device is authenticated, the image processor 26 determines whether the device 10 is worn by the user based on the positional relationship between the user and the device 10 in the device-image data in a manner similar to the above (S14).

Once it is determined that the device 10 is worn by the user, the image processor 26 determines that the proper state for measurement in which the proper user wears the proper device is reached (S15).

In contrast, the image processor 26 determines that the proper state for measurement in which the proper user wears the proper device is not reached (S16) if the user's face cannot be authenticated in step S12, if the body portion of the user other than the face fails to be identified in step S21, if the body portion of the user other than the face is not identified in step S23 as a body portion of the user whose face has been authenticated, or if the device is not worn by the user in step S14.

The measurement controller 20 continues to repeat the operation in steps S11 to S16 and steps S21 to S23, which is described above, and determines that the period in which the device 10 is determined to be worn by the user after the authentication of the user and the device 10 is the period of the proper state for measurement in which the proper user wears the proper device.

Alternatively, the measurement controller 20 may continue to repeat the operation in steps S13 to S16 and steps S21 to S23 based on the device-image data only.

According to an exemplary aspect, the controller 22 of the measurement controller 20 can also be configured to measure the vital data of the user by using the device 10 during the determination of the period of the proper state for measurement, which is described above. In such a case, for example, the vital data measured by using the device 10 includes the information with regard to the measurement period, and the information with regard to the determination of the period of the proper state for measurement includes the information with regard to the determination period. Then, based on the period of the proper state for measurement (determination period), which is described above, and the measurement period of the vital data, it can be determined that the vital data measured during the period of the proper state for measurement (determination period) is highly reliable data.

Alternatively, in accordance with the determination of the period of the proper state for measurement, which is described above, the controller 22 of the measurement controller 20 can be configured to control the device 10 to measure the vital data of the user during a period determined to be the period of the proper state for measurement and control the device 10 not to measure the vital data of the user during a period other than the period determined to be the period of the proper state for measurement.

As described above, the vital-data measurement controller 20 and the method for determining a state for vital-data measurement according to the second embodiment can also provide an advantage similar to the advantage provided by the vital-data measurement controller 20 and the method for determining a state for vital-data measurement according to the first embodiment, which is described above.

Sixth Modification of the Exemplary Aspect

In the second embodiment, similarly to the first modification of the first embodiment, which is described above, the controller 22 can also be configured to control panning, tilting, zooming, or wide-angle view mode of the camera 21 in such a manner that the camera 21 follows the movement of the user. According to this procedure, the user's face and the device 10 are unlikely to be outside the area covered by the image data, and the likelihood of improper replacement of the vital data can more effectively be reduced.

Seventh Modification of the Exemplary Aspect

In the second embodiment, similarly to the second modification of the first embodiment, which is described above, the controller 22 can also be configured to control the display (notification unit) 29 to give a notification to urge the user to move to an appropriate position. According to this procedure, the user's face and the device 10 are unlikely to be outside the area covered by the image data, and the likelihood of improper replacement of the vital data can more effectively be reduced.

Eighth Modification of the Exemplary Aspect

In the second embodiment, similarly to the third modification of the first embodiment, which is described above, the controller 22 can also be configured to control the display (notification unit) 29 to notify the user of the appropriate position at which the device is to be disposed. This procedure enables the user to wear the device 10 at the appropriate position, and a more appropriate state for measurement is reached.

Ninth Modification of the Exemplary Aspect

In the second embodiment, similarly to the fourth modification of the first embodiment, which is described above, when determining in step S14 whether the proper state for measurement is reached, the image processor 26 can also further be configured to determine whether the position at which the device 10 is disposed is appropriate. This procedure improves the accuracy of the measurement data.

Tenth Modification of the Exemplary Aspect

In the second embodiment, similarly to the fifth modification of the first embodiment, which is described above, when determining in step S14 whether the proper state for measurement is reached, the image processor 26 can also be configured to determine whether the user's posture is appropriate. For example, the image processor 26 determines whether the proper state for measurement is reached based on the type of the device 10 in the device-image data, the positional relationship between the user's face and the body portions other than the face in the user-image data and the device-image data, and the movement of the user's entire body per unit time, the proper state for measurement being a quiet posture in accordance with the type of the device. This procedure improves the accuracy of the measurement data.

In general, it is noted that exemplary embodiments of the present invention have been described as above, but the present invention is not limited to these embodiments, and various changes, modifications, and combinations are possible. For example, in the embodiments described above, the description has been given with regard to the examples of the vital-data measurement controller 20 and the vital-data measurement system 1 that acquire a single type of vital data measured by using a single type of device for vital-data measurement 10. However, the present invention is not limited to these embodiments and can be applied to a vital-data measurement controller and a vital-data measurement system that simultaneously acquire multiple types of vital data measured by using multiple types of devices for vital-data measurement.

Figure 12:
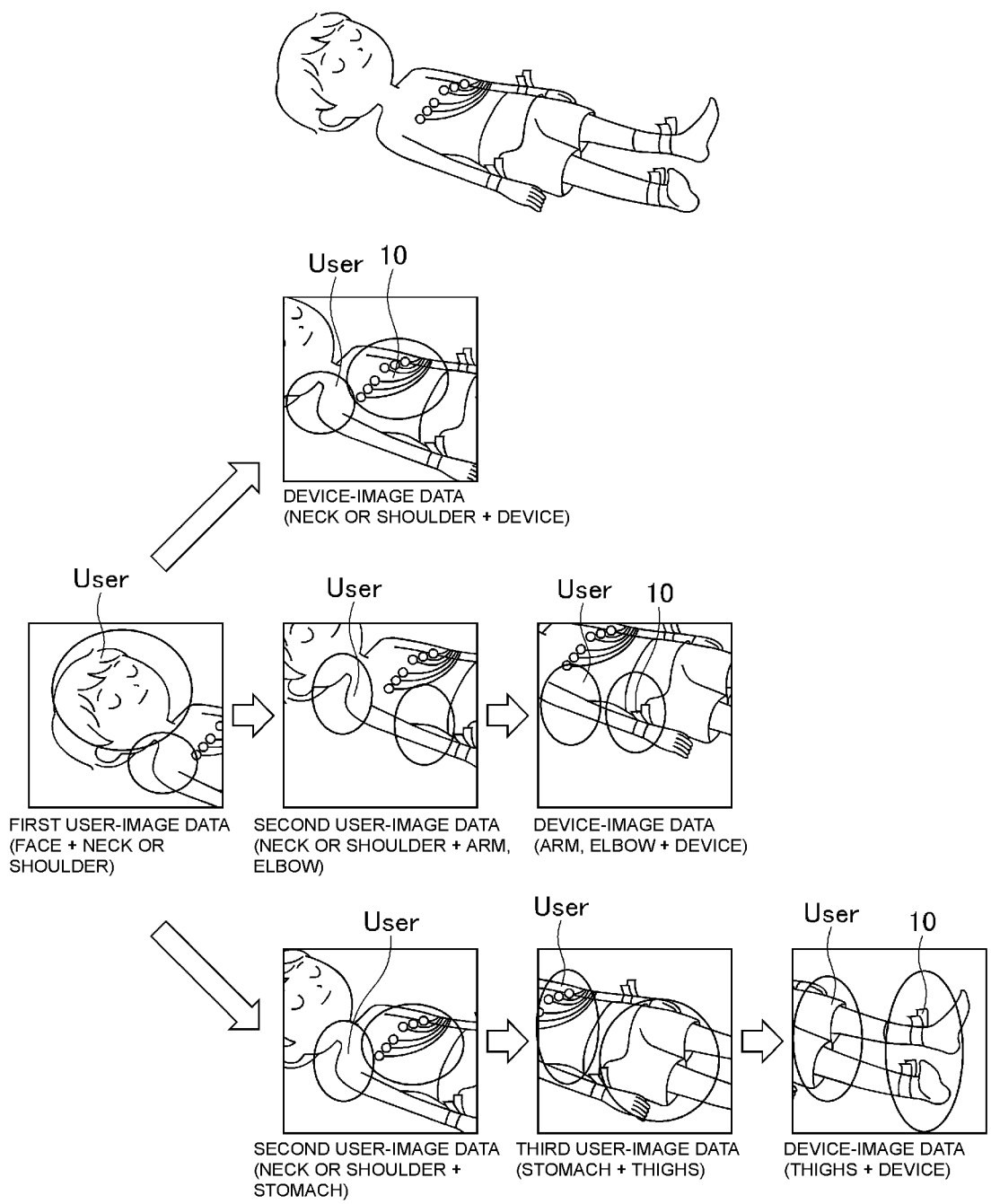
FIG. 12 illustrates an example of user-image data and device-image data.

For example, the present invention can be applied to a 12-lead electrocardiogram measurement as illustrated in FIG. 12. For example, the second embodiment can be applied to determine that the proper user is in the proper state for measurement in which the proper user wears multiple proper devices (e.g., six electrodes on the chest and four electrodes on the wrists and the ankles) based on the user-image data and the device-image data.

Although the vital-data measurement controller 20 has the functionality of the controller 22 and the image processor 26 in the embodiments described above, the host apparatus on the medical doctor's premises may have part of the functionality of the controller 22 and the image processor 26. This arrangement enables the medical doctor to control vital-data measurement when performing online diagnosis and treatment in real time.

Although the device for vital-data measurement 10 and the method for determining a state for vital-data measurement to be used for remote diagnosis and treatment have been described as examples in the embodiments described above, the present invention is not limited to these examples and can be applied to various fields. For example, as described in Patent Document 1, the present invention can be applied to the fields of medical insurance or life insurance.

REFERENCE SIGNS LIST 1 vital-data measurement system
5 network
10 device for vital-data measurement
20 vital-data measurement controller
21 camera (image capturing apparatus)
22 controller
24 storage unit
26 image processor
28 operation unit
29 display (notification unit)
30 host apparatus
40 storage medium
AP access point

The invention claimed is:

1. A data measurement controller configured to control data measurement of a user, the data measurement controller comprising:
    a controller configured to control an image capturing apparatus to acquire image data including a facial image of the user and at least one device for vital-data measurement; and
    an image processor configured to:
        authenticate the facial image of the user and the at least one device based on the acquired image data, determine whether the at least one device is worn by the user based on a positional relationship between the user and the at least one device in the acquired image data, and determine, after the facial image of the user and the at least one device is authenticated, that a period in which the at least one device is determined to be worn by the user is a period of a proper state for the at least one device to perform the vital-data measurement of the user, wherein the controller is further configured to acquire the image date, which includes first user-image data, n-th user-image data, and the device-image data, wherein the first user-image data includes the user's face and a first body portion of the user other than the face, the n-th user-image data includes an (n−1)-th body portion of the user and an n-th body portion of the user, wherein the device-image data includes the n-th body portion of the user and the at least one device, the (n−1)-th body portion of the user being other than the face, the n-th body portion of the user being other than the (n−1)-th body portion, and wherein n is an integer equal to 2 or larger.

2. The data measurement controller according to claim 1, wherein the image processor is configured to determine whether the proper state is reached based on a type of the at least one device, a positional relationship between the user's face and a body portion of the user other than the face, and movement of the user's entire body per unit time in the acquired image data.

3. The data measurement controller according to claim 2, wherein the proper state is a quiet posture based on the type of the at least one device.

4. The data measurement controller according to claim 1, wherein the controller is configured to control panning and tilting of the image capturing apparatus such that the image capturing apparatus follows a movement of the user.

5. The data measurement controller according to claim 1 further comprising a notification unit configured to generate a notification to instruct the user to move.

6. The data measurement controller according to claim 1 further comprising a notification unit configured to notify the user of a position at which the at least one device is to be disposed.

7. The data measurement controller according to claim 1 further comprising:

a storage unit configured to store a feature value of each of the at least one device as registration information, wherein the at least one device comprising a plurality of devices, and wherein the image processor is configured to authenticate the plurality of devices based on the respective feature values of each of the plurality of devices.

8. The data measurement controller according to claim 7, wherein the storage unit is configured to store the feature values and associated pieces of identification information of the plurality of devices as the registration information, wherein the image processor is configured to authenticate one of the plurality of devices based on a respective feature value associated with a piece of identification information of the one of the plurality of devices, and wherein the piece of identification information is input by the user.

9. The data measurement controller according to claim 1, wherein the controller is configured to control the at least one device to perform the vital-data measurement of the user during the determination of the period of the proper state.

10. The data measurement controller according to claim 1, wherein, based on the determination of the period of the proper state, the controller is configured to control the at least one device to perform the vital-data measurement of the user during the period of the proper state and control the at least one device not to perform the vital-data measurement of the user during a period other than the period of the proper state.

11. A data measurement system comprising:

the data measurement controller according to claim 1, the vital-data measurement controller being configured to control the vital-data measurement when a user measures vital data by using the at least one device for vital-data measurement;

the at least one device;

the image capturing apparatus; and a host apparatus configured to receive the vital data from the vital-data measurement controller.

12. A data measurement controller configured to control data measurement of a user, the data measurement controller comprising:

a controller configured to control an image capturing apparatus to acquire user-image data and device-image data, with the user-image data including the user's face and a body portion of the user other than the face and the device-image data including the body portion and the at least one device; and an image processor configured to:

authenticate the user's face based on the acquired user-image data, authenticate the at least one device based on the acquired device-image data, determine whether the at least one device is worn by the user based on a relationship between the body portion of the user in the acquired user-image data and the body portion of the user in the device-image data and a positional relationship between the body portion of the user and the at least one device in the acquired device-image data, and determine, after the user and the at least one device is authenticated, that a period in which the at least one device is determined to be worn by the user is a period of a proper state for measurement by the at least one device, wherein the controller is further configured to acquire the user-image data as first user-image data and n-th user-image data, wherein the first user-image data includes the user's face and a first body portion of the user other than the face, the n-th user-image data includes an (n−1)-th body portion of the user and an n-th body portion of the user, wherein the device-image data includes the n-th body portion of the user and the at least one device, the (n−1)-th body portion of the user being other than the face, the n-th body portion of the user being other than the (n−1)-th body portion, and wherein n is an integer equal to 2 or larger.

13. The vital-data measurement controller according to claim 12, wherein the image processor is further configured to:

authenticate the user's face based on the first user-image data and authenticate the at least one device based on the device-image data, and determine whether the at least one device is worn by the user based on a relationship between the first body portion of the user other than the face in the first user-image data and the (n−1)-th body portion of the user in the n-th user-image data, a relationship between the n-th body portion of the user in the n-th user-image data and the n-th body portion of the user in the device-image data, and a positional relationship between the n-th body portion of the user and the at least one device in the device-image data.

14. The vital-data measurement controller according to claim 12, wherein the image processor is further configured to determine whether the proper state for measurement is reached based on a type of the at least one device in the device-image data, a positional relationship between the user's face and a body portion of the user other than the face in the user-image data and the device-image data, and movement of the user's entire body per unit time.

15. The vital-data measurement controller according to claim 14, wherein the proper state for measurement is a quiet posture based on the type of the at least one device.

16. A vital-data measurement system comprising:
the vital-data measurement controller according to claim 12, the vital-data measurement controller being configured to control the vital-data measurement when a user measures vital data by using the at least one device for the vital-data measurement;
the at least one device;
the image capturing apparatus; and
a host apparatus configured to receive the vital data from the vital-data measurement controller.

17. A method for determining a state for data measurement by using at least one device for vital-data measurement of a user, the method comprising:
controlling an image capturing apparatus to acquire image data including a facial image of the user and the at least one device;
authenticating the facial image of the user and the at least one device based on the acquired image data;
determining whether the at least one device is worn by the user based on a positional relationship between the user and the at least one device in the acquired image data; and
determining, after the facial image of the user and the at least one device is authenticated, that a period in which the at least one device is determined to be worn by the user is a period of a proper state for the at least one device to perform the vital-data measurement of the user,
wherein the acquiring of the image data includes acquiring first user-image data and n-th user-image data,
wherein the first user-image data includes the user's face and a first body portion of the user other than the face, the n-th user-image data includes an (n−1)-th body portion of the user and an n-th body portion of the user,
wherein the device-image data includes the n-th body portion of the user and the at least one device, the (n−1)-th body portion of the user being other than the face, the n-th body portion of the user being other than the (n−1)-th body portion, and
wherein n is an integer equal to 2 or larger.

18. A method for determining a state for data measurement by using at least one device for vital-data measurement of a user, the method comprising:
controlling an image capturing apparatus to acquire user-image data and device-image data, the user-image data including the user's face and a body portion of the user other than the face, the device-image data including the body portion of the user and the at least one device;
authenticating the user's face based on the acquired user-image data;
authenticating the at least one device based on the acquired device-image data;
determining whether the at least one device is worn by the user based on a relationship between the body portion of the user in the user-image data and the body portion of the user in the device-image data and a positional relationship between the body portion of the user and the at least one device in the device-image data;
determining, after the user and the at least one device are authenticated, that a period in which the at least one device is determined to be worn by the user is a period of a proper state for measurement by the at least one device;
acquiring first user-image data, n-th user-image data, and the device-image data, the first user-image data including the user's face and a first body portion of the user other than the face, the n-th user-image data including an (n−1)-th body portion of the user and an n-th body portion of the user, the device-image data including the n-th body portion of the user and the at least one device, the (n−1)-th body portion of the user being other than the face, the n-th body portion of the user being other than the (n−1)-th body portion, where n is an integer equal to 2 or larger;
authenticating the user's face based on the first user-image data and authenticating the at least one device based on the device-image data; and
determining whether the at least one device is worn by the user based on a relationship between the first body portion of the user other than the face in the first user-image data and the (n−1)-th body portion of the user in the n-th user-image data, a relationship between the n-th body portion of the user in the n-th user-image data and the n-th body portion of the user in the device-image data, and a positional relationship between the n-th body portion of the user and the at least one device in the device-image data.

* * * * *